United States Patent
Heyder et al.

(12) 
(10) Patent No.: US 6,681,602 B2
(45) Date of Patent: Jan. 27, 2004

(54) WASHING TUB FOR A WASHING MACHINE

(75) Inventors: Reinhard Heyder, Berlin (DE); Jörg Skrippek, Priort (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 0 days.

(21) Appl. No.: 10/174,061

(22) Filed: Jun. 17, 2002

(65) Prior Publication Data

US 2002/0194884 A1 Dec. 26, 2002

Related U.S. Application Data

(63) Continuation of application No. PCT/EP00/12298, filed on Dec. 6, 2000.

(30) Foreign Application Priority Data

Dec. 15, 1999 (DE) .......................................... 199 60 501

(51) Int. Cl.[7] .................................................. D06F 37/30
(52) U.S. Cl. ...................................................... 68/140
(58) Field of Search .......................... 68/3 R, 19.2, 24, 68/58, 140, 144

(56) References Cited

U.S. PATENT DOCUMENTS

| | | | |
|---|---|---|---|
| 5,329,791 A | | 7/1994 | Cargnel et al. ................. 68/24 |
| 5,862,686 A | * | 1/1999 | Skrippek ...................... 68/140 |
| 5,894,746 A | * | 4/1999 | Skrippek ...................... 68/140 |
| 5,979,195 A | * | 11/1999 | Bestell et al. ................. 68/23.2 |
| 5,996,379 A | * | 12/1999 | Skrippek ...................... 68/140 |
| 6,050,113 A | * | 4/2000 | Skrippek et al. ............... 68/140 |
| 6,131,422 A | * | 10/2000 | Skrippek et al. ............... 68/140 |
| 6,460,382 B1 | * | 10/2002 | Kim et al. ..................... 68/140 |
| 2003/0015005 A1 | * | 1/2003 | Heyder et al. .................. 68/24 |

FOREIGN PATENT DOCUMENTS

| | | |
|---|---|---|
| DE | G 92 15 811.0 | 4/1993 |
| DE | 195 47 456 A1 | 6/1997 |
| DE | 195 47 745 A1 | 6/1997 |
| DE | 197 24 475 A1 | 12/1998 |
| DE | 197 24 930 A1 | 12/1998 |
| EP | 0 219 115 A2 | 4/1987 |
| GB | 2 202 867 A | 10/1988 |
| GB | 2 333 300 A | 7/1999 |

* cited by examiner

*Primary Examiner*—Randy Gulakowski
*Assistant Examiner*—Joseph Perrin
(74) *Attorney, Agent, or Firm*—Laurence A. Greenberg; Werner H. Stemer; Ralph E. Locher

(57) ABSTRACT

A washing machine includes a washing tub having a plastic injection-molded rear wall with a shaft mounted in the rear wall. An at least substantially horizontally mounted laundry drum is connected to the shaft in a rotationally fixed manner. A drive mechanism is connected to the drum for driving the drum, the drive mechanism has a stator support part. The rear wall is plastic injected molded around the stator support part for rotationally fixing the stator support part to the rear wall of the tub.

20 Claims, 5 Drawing Sheets

WASHING TUB FOR A WASHING MACHINE

CROSS-REFERENCE TO RELATED APPLICATION

This application is a continuation of copending International Application No. PCT/EP00/12298, filed Dec. 6, 2000, which designated the United States and was not published in English.

BACKGROUND OF THE INVENTION

Field of the Invention

The invention relates to a washing tub for a washing machine, having a rear wall made from injection-molded plastic and a laundry drum mounted at least substantially horizontally and connected in a manner fixed in rotation to a shaft mounted in the rear wall and driven through a drive mechanism.

German Utility Model DE 92 15 811 U1, corresponding to U.S. Pat. No. 5,329,791 to Cargnel, discloses such a conventional washing tub made entirely of plastic and, thus, also includes a rear wall made from plastic. The rear wall has ribs, preferably extending radially, which increase the strength of the washing tub. A radial ring is also present to achieve greater strength, the radial ring extending concentrically with a central hub. Supported in the hub through bearings is a drive shaft that bears the laundry drum. The shaft is disposed horizontally and is driven through a drive mechanism.

British Patent No. GB 2 333 300 A and European Patent Application EP 0 219 115 A2 likewise disclose a washing tub made from plastic for a washing machine.

German Published, Non-Prosecuted Patent Application DE 197 24 930 A1, corresponding to U.S. Pat. No. 6,050,115 to Skrippek et al., discloses a washing machine having a drive mechanism whereby the laundry drum is driven directly. The motor includes a stator connected to the base wall of the washing tub. The rotor is disposed at the end on the shaft of the laundry drum.

SUMMARY OF THE INVENTION

It is accordingly an object of the invention to provide a washing tub for a washing machine that overcomes the hereinafore-mentioned disadvantages of the heretofore-known devices of this general type and that improves a washing tub by compactly constructing the drive mechanism.

With the foregoing and other objects in view, there is provided, in accordance with the invention, a washing tub for a washing machine, including a plastic injection-molded rear wall, a shaft mounted in the rear wall, an at least substantially horizontally mounted laundry drum connected to the shaft in a rotationally fixed manner, a drive mechanism connected to the drum for driving the drum, the drive mechanism having a stator support part, and the rear wall plastic injected molded around the stator support part and rotationally fixing the stator support part thereto.

The stator support part of the drive mechanism is, preferably, of metal; in particular, it is a gray iron casting or an aluminum casting. It can be placed in a plastics injection-molding device such that plastic can be injected around it. As a result, a simple positive-fitting or non-positive-fitting connection with the plastics part can be achieved. The plastics part may be the rear wall of a washing tub, a part of the washing tub encompassing the rear wall, or the washing tub as a whole.

In accordance with another feature of the invention, the stator support part is connected through its surface to the plastic by positive or non-positive fitting. For such a purpose, the stator support part includes, on the side facing the plastics rear wall projections, lugs, notches or recesses into which the plastic is injected or around which the plastic is injected, as the case may be, so that a positive-fitting connection between the stator support part and the rear wall is achieved. Alternatively, the stator support part includes a surface that, for example, has sufficient roughness to create an adequately non-positive-fitting connection between the metal of the stator support part and the plastic of the rear wall.

Preferably, the stator support part is disposed centrally around the drive shaft and includes stator packs disposed concentrically with the drive shaft, if a direct drive for the laundry drum is provided. Alternatively, a stator support part may also be disposed eccentrically relative to the drive shaft on the rear wall of the washing tub if a transmission or a drive belt in conjunction with pulleys is disposed on the rear wall of the washing tub to transmit the rotational movement of the drive mechanism to the drive shaft. Such a drive mechanism for the indirect drive, which is fixed on the rear wall of the washing tub, is disclosed in German Published, Non-Prosecuted Patent Application DE 199 11 139 A1.

As a result of the configuration according to the invention of the rear wall of the washing tub, a simple bearing for the stator support part of the drive mechanism is provided, the stator support part simultaneously increasing, because of its shape, the strength of the rear wall. Preferably, the stator support part is also surrounded by an annular wall, which interacts with a reinforcing rib of the rear wall. The rear wall preferably includes an angled web that at least partially encloses the annular wall portion of the stator support part.

In accordance with a further feature of the invention, the rear wall has a base wall and a reinforcing ring and the stator support part is connected to the base wall and to the reinforcing ring.

In accordance with an added feature of the invention, the reinforcing ring has a collar enclosing the stator support part.

In accordance with an additional feature of the invention, the drive mechanism has a bearing sleeve and the stator support part encloses the bearing sleeve.

In accordance with yet another feature of the invention, the stator support part forms a bearing sleeve for receiving bearings through which the shaft 5 is mounted to the rear wall 3.

In accordance with yet a further feature of the invention, the drive mechanism has a bearing sleeve and the bearing sleeve has a plastic shell.

In accordance with yet an added feature of the invention, the plastic shell is a reinforcing ring.

In accordance with yet an additional feature of the invention, the stator support part has rings concentric with the shaft.

In accordance with a concomitant feature of the invention, the rear wall has a base wall with a convexity concentric with the shaft and enclosed by the stator support part. The rear wall includes at least one annular convexity, which is enclosed by a wall portion of the stator support part so that a large connecting surface is formed between the rear wall and the stator support part and a high non-positive fit comes about between the two. The connection between the rear wall and the stator support part in this case is additionally supported by convexities or projections that are not symmetrical in rotation about the axis of the drive shaft.

The invention can be used both with a horizontally mounted laundry drum and with a laundry drum mounted at an angle, in which case the laundry drum is mounted, for example, at 15° relative to the horizontal.

As a result of the configuration according to the invention, the drive mechanism has a compact structural form and can simultaneously be connected in a simple manner to the rear wall.

Other features that are considered as characteristic for the invention are set forth in the appended claims.

Although the invention is illustrated and described herein as embodied in a washing tub for a washing machine, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
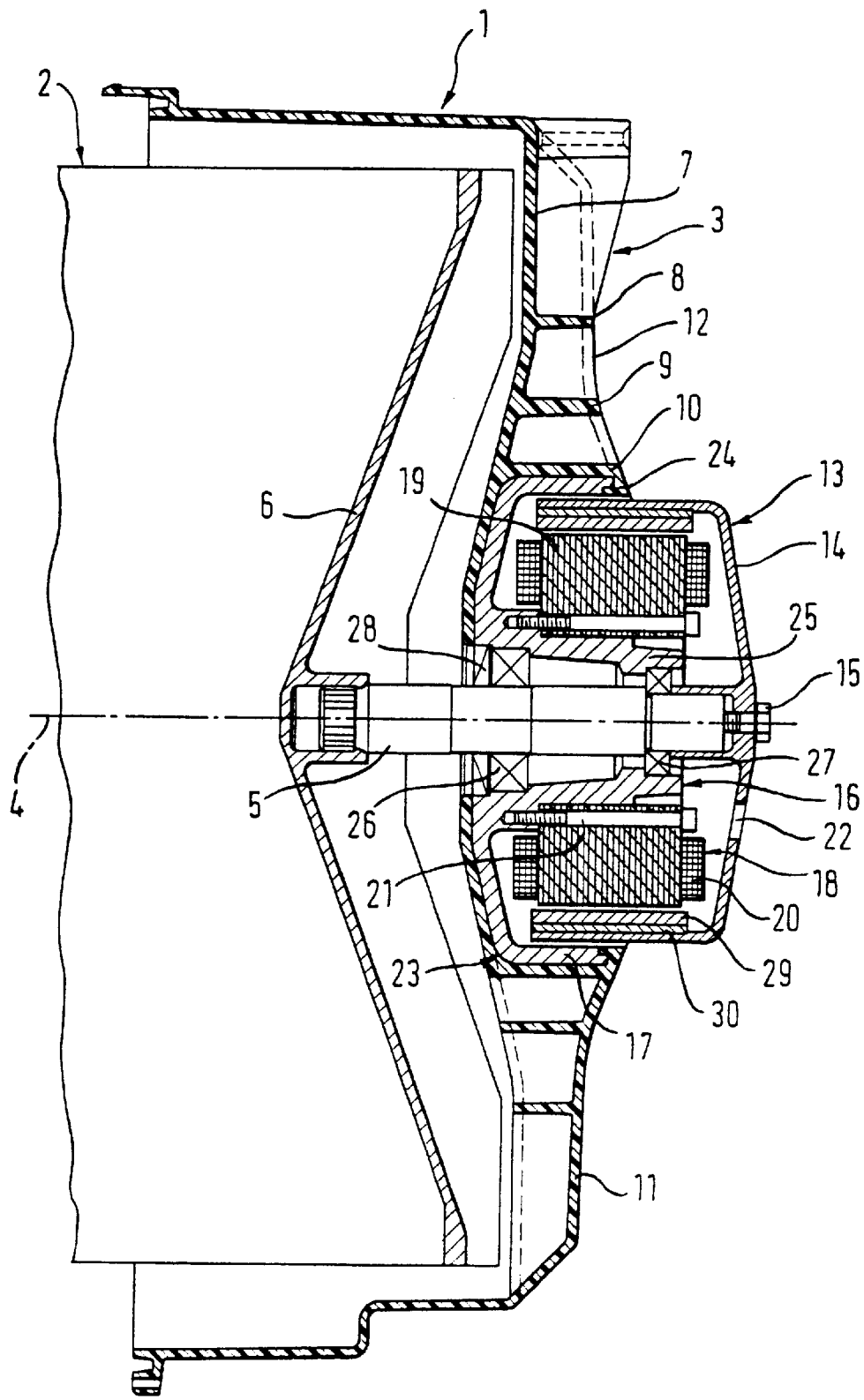
FIG. 1 is a fragmentary, cross-sectional view of a drive mechanism according to the invention disposed on a rear wall of a washing tub.

Referring now to the figures of the drawings in detail and first, particularly to FIG. 1 thereof, there is shown a washing tub 1 of a washing machine floatingly mounted in a non-illustrated housing of the washing machine. Disposed therein is a laundry drum 2, which is mounted in a rear wall 3 of the washing tub 1 to revolve about a horizontally disposed axis 4. The mounting is provided by a shaft 5, which is connected to a rear wall 6 of the laundry drum 2 in a rotationally fixed manner.

Either the washing tub 1 is made entirely from plastic or only its rear wall 3 is made from plastic. The production of the rear wall 3 takes place by an injection molding method. The rear wall 3 for its part includes a base wall 7 and reinforcing rings 8, 9, and 10 extending concentrically with respect to the axis 4 and pointing outward from the base wall 7. As such, a stable construction of the rear wall 3 is provided. In addition, radially extended reinforcing ribs 11, 12 are present that extend outward from the center of the rear wall 3, preferably, at equal distances from one another, and increase the strength of the rear wall 3.

Disposed on the rear wall 3 of the washing tub 1 is a drive mechanism 13. The drive mechanism 13 includes a rotor 14 of bell-shaped form that, like the laundry drum 2, is connected to the shaft 5 in a rotationally fixed manner. To produce the connection between the rotor 14 and the shaft 5, a screw 15 is provided, the screwing of the rotor 14 on the shaft 5 being fixed in rotation by positive fitting through a profiled shaft, profiled hub, feather key, conical, or spline connection.

The drive mechanism 13 includes a stator 16, which includes a stator support part 17 and stator packs 18. The stator packs 18 include metal sheet packs 19 that are surrounded by exciter windings 20. The metal sheet packs 19 are fixed to the stator support part 17 by screws 21. The screws 21 can be pushed through openings 22 in the rotor 14.

The stator support part 17 is fixedly connected to the rear wall 3 by being enclosed by the plastic of the base wall 7 and of the reinforcing ring 10. In production, the stator support part 17 is laid in the injection-molding machine so that it can be enclosed by the plastic. As a result, an intimate and lasting connection, fixed in rotation, is formed between a wall portion 23 of the stator support part 17 and the rear wall 3. The reinforcing ring 10 includes a collar 24 that points toward the axis 4 and encloses the outer edge of the stator support part 17. As a result, a positive-fitting connection is also formed between the stator support part 17 and the rear wall 3.

The stator support part 17 is so configured that it also forms a bearing sleeve 25 for receiving ball bearings or roller bearings 26, 27, through which the shaft 5 is mounted in the rear wall 3.

Connected to a shoulder of the bearing sleeve 25 of the stator support part 17 is a gasket 28 that prevents the escape of washing fluid from the washing tub 1 during the washing operation.

Magnetic poles 29 are distributed as segments on the inner circumference of the rotor 13. Magnetic steel sheets 30 are provided to complete the magnetic circuit between the poles 29.

The rotationally fixed connection between the stator support part 17 and the rear wall 3 is preferably supported by the fact that the stator support part 17 is also connected by positive fitting in the circumferential direction to a part of the rear wall 3, for example, to the reinforcing ring 10. For such a purpose, the wall portion 23 of the stator support part includes projecting ribs, spaced apart from one another at, preferably, equal intervals that correspond to matching recesses in the reinforcing ring 10; or, conversely, the reinforcing ring 10 includes projections or lugs projecting inward toward the wall portion 23 that correspond to matching notches in the wall portion 23 of the stator support part 17. As a result, the fixed connection between the rear wall 3 and the stator support part 17 is further strengthened.

In the event, however, that the plastic can already be sufficiently strongly connected to the surface of the wall portion 23, such additional positive-fitting connections between the wall portion 23 and the reinforcing ring 10 or with the base wall 7 are not necessary.

In a further exemplary embodiment (FIG. 2) there is provided, instead of the stator support part 17 enclosing the bearing sleeve 25, a stator support part 31 that merely bears the stator packs 18 and is spaced apart from the shaft 5 in an annular manner. Otherwise, the stator support part 31 is connected to the rear wall 3 in the same manner as the stator support part 17, a positive-fitting or non-positive-fitting connection being formed between the base wall 7 and the reinforcing ring 10.

Figure 2:
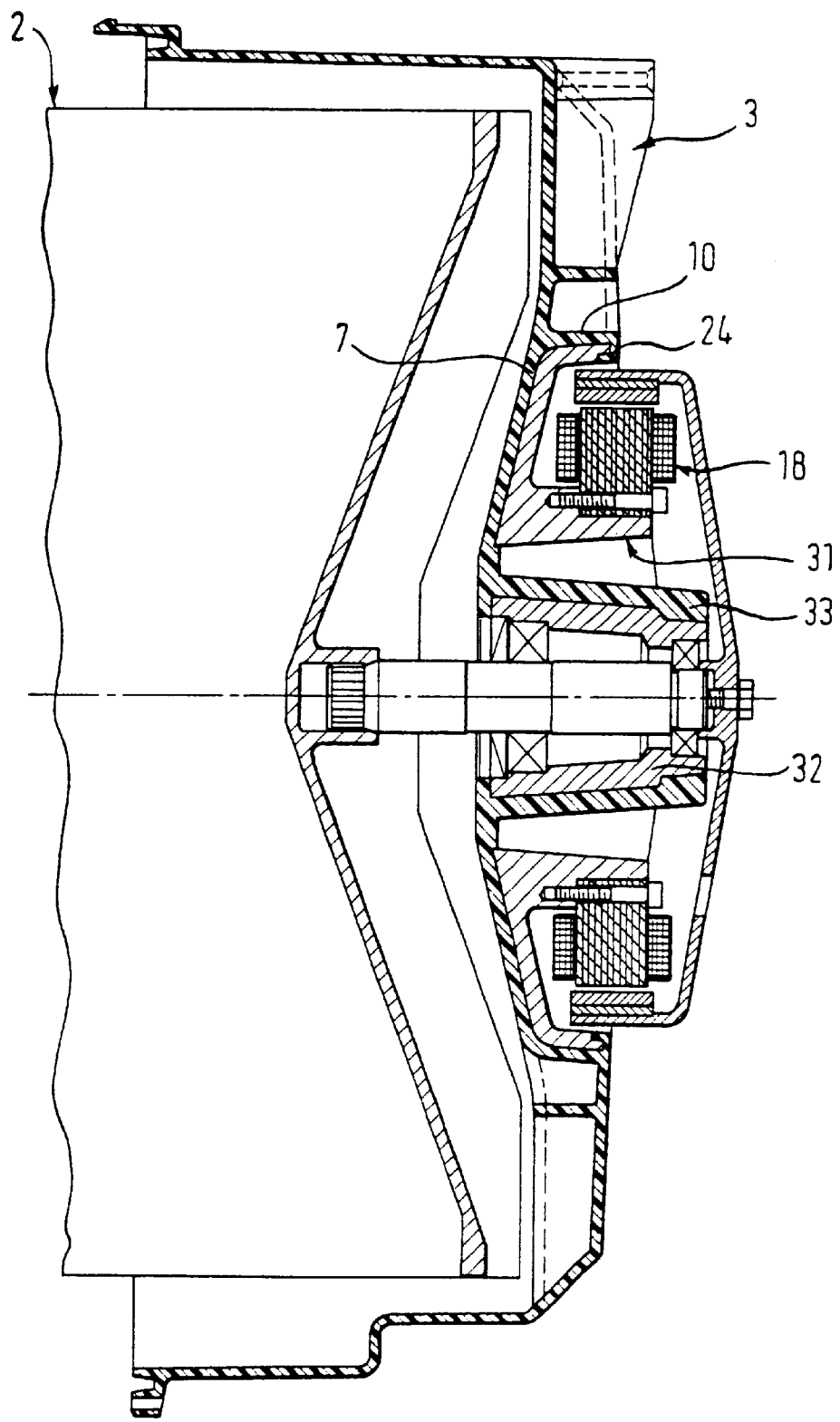
FIG. 2 is a fragmentary, cross-sectional view of an alternative embodiment of the drive mechanism of FIG. 1.

Instead of the bearing sleeve 25, in the embodiment according to FIG. 2, a separate bearing sleeve 32 is present that encloses the roller bearings or ball bearings 26, 27 and is enclosed by a reinforcing ring 33, with positive and/or non-positive fitting. Similarly, the bearing sleeve 32 is connected to the base wall 3 in the same manner. In the embodiment shown in accordance with FIG. 2, the plastic that forms the base wall 3 or the entire washing tub 1 is injected around both the stator support part 31 and the bearing sleeve 32 in a joint production process. The stator support part 31 and the bearing sleeve 32, thus, form integral parts of the rear wall 3 and increase its strength so that they replace the reinforcing rings that are otherwise present there. As a result, there is a saving of material for the rear wall 3 and the rear wall 3 acquires a more compact structure than would be possible with a separate configuration of the rear wall 3 and of the drive mechanism 13.

Figure 3A:
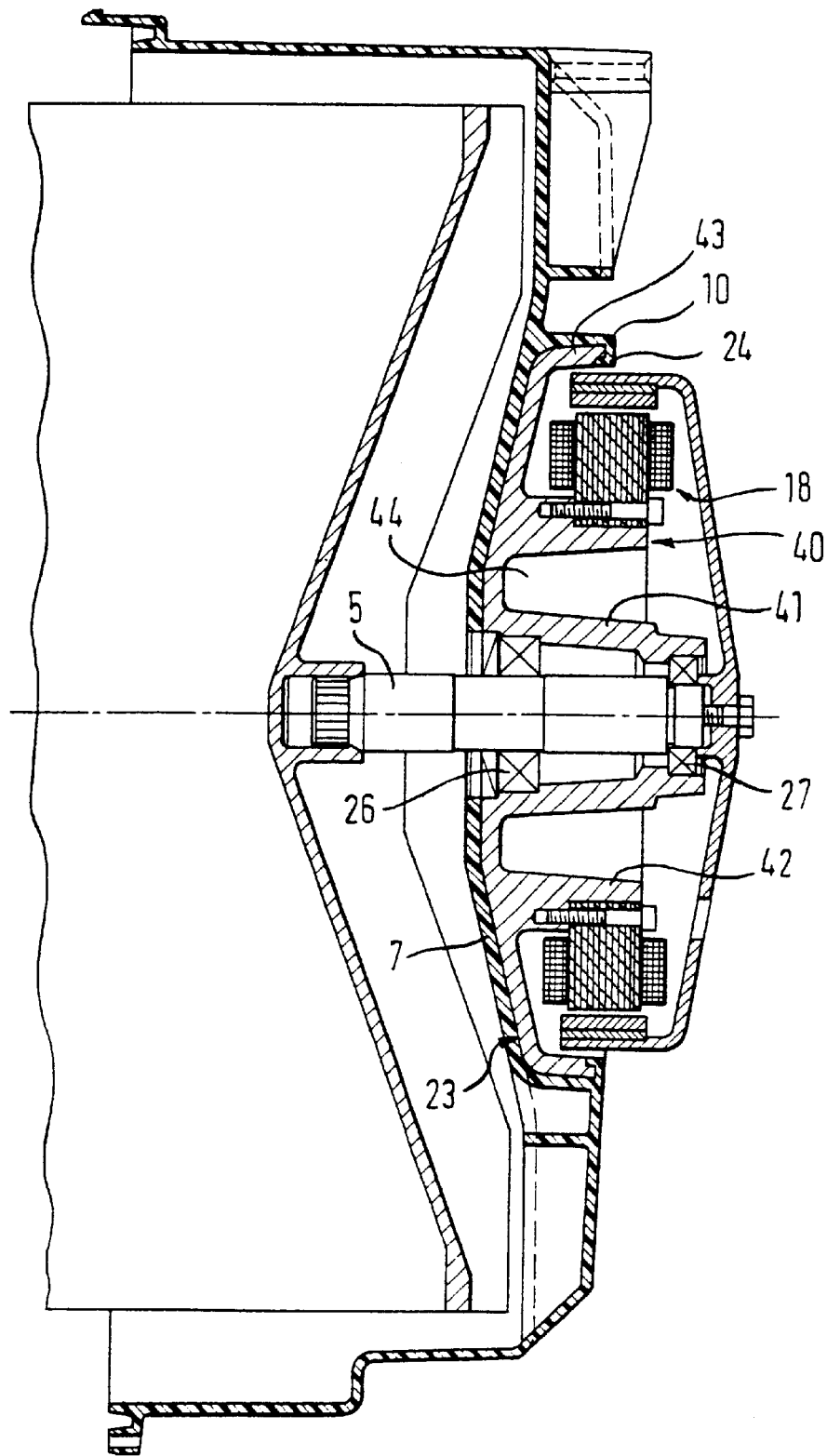
FIG. 3a is a fragmentary, cross-sectional view of a third alternative embodiment of the drive mechanism of FIG. 1.

In a further embodiment (FIG. 3a) a stator support part 40 is connected through its wall portion 23 to the base wall 7. The stator support part 40 encloses three concentric rings 41, 42, 43, of which the innermost ring 41 forms the bearing sleeve for the ball bearings or roller bearings 26, 27. The middle ring 42 bears on its outer side, in other words on the side remote from the shaft 5, the stator packs 18. The outermost ring 43 is connected with positive and/or non-positive fitting to the reinforcing ring 10. A convexity 44 existing between the rings 41 and 42 permits a construction of the stator support part 40 that is economical of material, the stator support part 40 simultaneously contributing by its shape to increasing the strength of the rear wall 3, being connected thereto through its wall portion 23 with positive and/or non-positive fitting. Preferably, the reinforcing ring 10 includes the collar 24 that overhangs the ring 43. Projections or notches of the wall portion 23 may also be provided in the region between the wall portion 23 and the base wall 7, and correspond to matching recesses and projections, respectively, of the base wall 7. Similarly, reinforcing ribs, as made by the rear wall 3, may be provided between the rings 41, 42, 43.

Figure 3B:
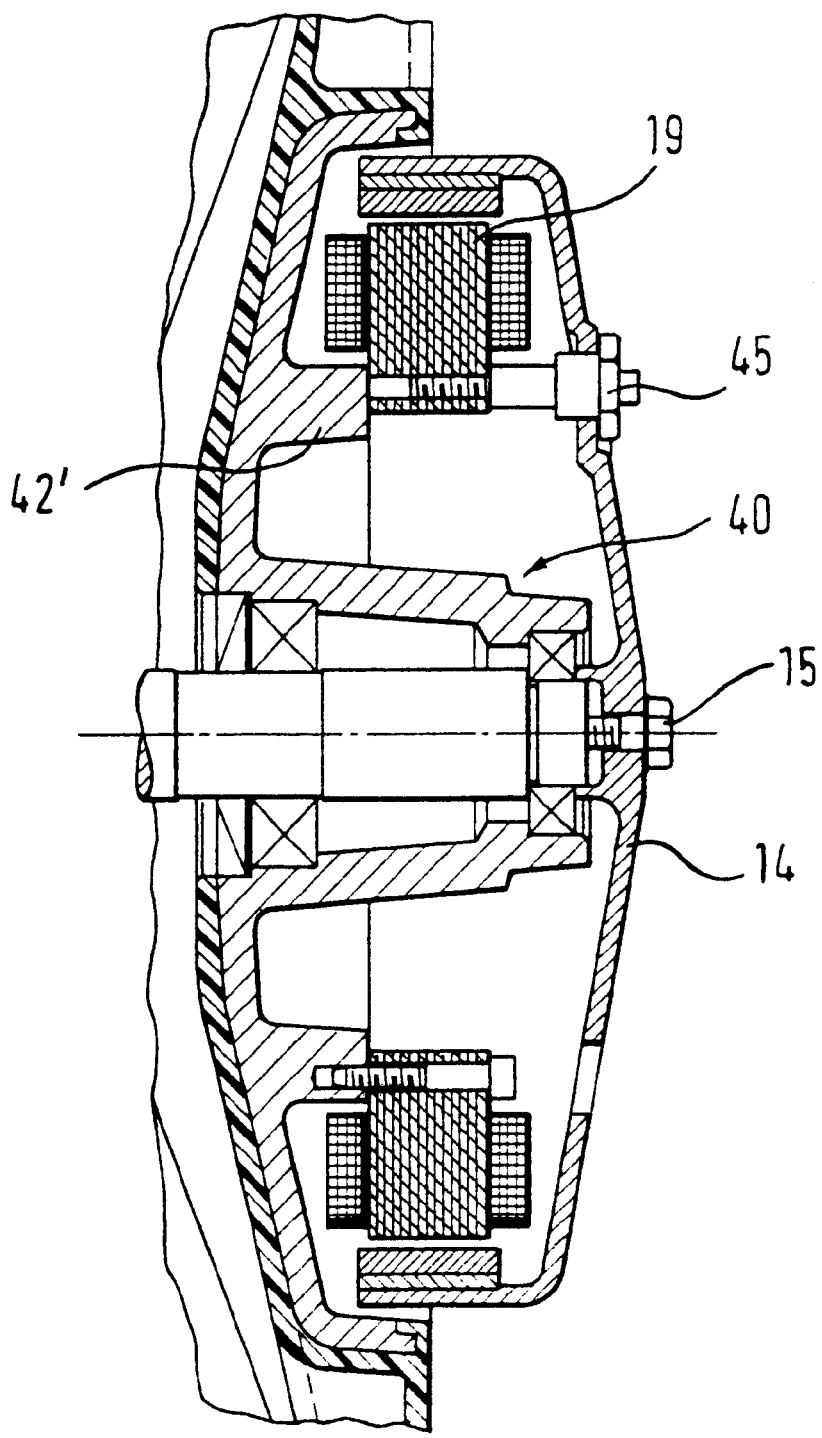
FIG. 3b is a fragmentary, cross-sectional view of a third alternative embodiment of the drive mechanism of FIG. 1.

In a further exemplary embodiment (FIG. 3b), the middle ring 42' has a shortened form. During transportation and at the start of assembly of the stator packs 18 on the stator support part 40, the rotor 13 is connected through locking screws 45 to the metal sheet packs 19 of the stator packs, these screws being loosened after the metal sheet packs 19 with the stator support part 40 and the rotor 14 are fixed on the shaft 5 by the screw 15.

Figure 4:
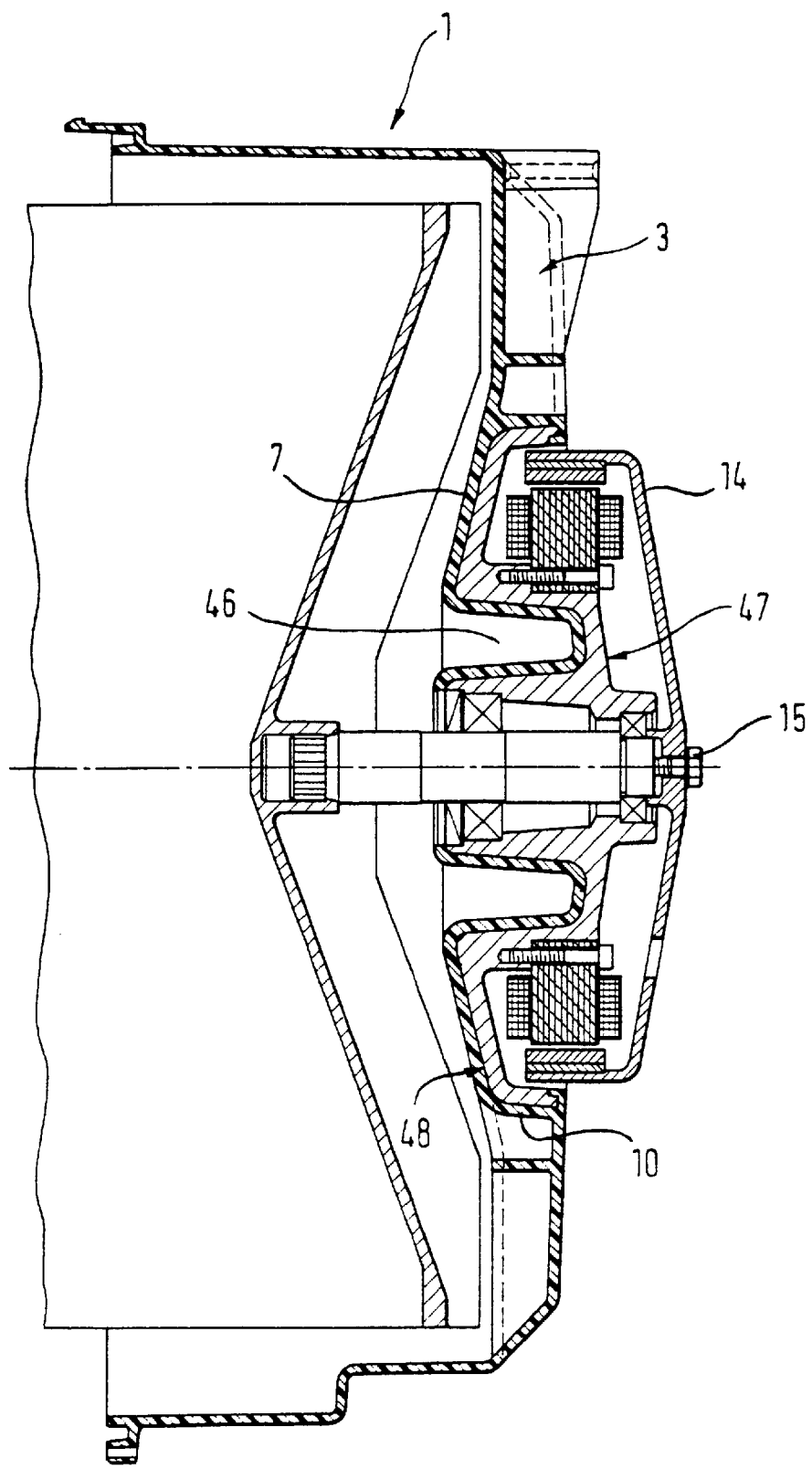
FIG. 4 is a fragmentary, cross-sectional view of a fourth alternative embodiment of the drive mechanism of FIG. 1.

In another exemplary embodiment (FIG. 4), the base wall 7 of the rear wall 3 of the washing tub 1 includes an annular convexity 46 concentric with the shaft 5 and fixedly enclosed by a stator support part 47. As a consequence of the convexity 46, the surface of a wall portion 48 of the stator support part 47 is enlarged by comparison with the surface of the wall portion 23 of the stator support part 17, the stator support part 31, or the stator support part 40, which creates a better non-positive-fitting connection between the base wall 7 and the stator support part 47. Finally, the stator support part 47, as shown in FIGS. 1, 2, 3a, and 3b, is connected to the reinforcing ring 10 of the rear wall 3. In particular, the collar 24 is also present on the reinforcing ring 10.

According to the invention, stator support parts 17, 31, 40, 47 are, thus, created that permit, by their wall portions 23, 48, a good non-positive-fitting connection with the base wall 7 and/or the reinforcing ring. In addition, projections, lugs, notches, recesses, ribs, and the like are, preferably, disposed on the stator support part 17, 31, 40, or 47 and are enclosed by matching parts of the rear wall 3, in other words, of the base wall 7 or of the reinforcing ring 10, so that the non-positive-fitting connection, which is already provided by the wall portion 23 of the stator support part 17, 31, 40, 47, is supplemented by a positive-fitting connection. Also, as a result of the convexity in the base wall 7 and matching concavities in the stator support part 17, 31, 40, 47, the non-positive-fitting connection between the latter and the base wall 7 is supported.

The invention described above can also be used in the case of a drive mechanism that is disposed non-concentrically with the shaft 5 behind the rear wall 3 of the washing tub 1, as is disclosed in German Published, Non-Prosecuted Patent Application DE 199 11 139 A1. In all cases, the strength of the rear wall 3 is supported by an integral installation of the drive mechanism, and a simply configured structure of the washing tub 1 is provided in conjunction with the drive mechanism 13.

We claim:

1. A washing tub for a washing machine, comprising:

a plastic injection-molded rear wall;

a shaft mounted in said rear wall;

an at least substantially horizontally mounted laundry drum connected to said shaft in a rotationally fixed manner;

a drive mechanism connected to said drum for driving said drum, said drive mechanism having a stator support part; and said rear wall being plastic injected molded around said stator support part for rotationally fixing said stator support part thereto.

2. The washing tub according to claim 1, wherein said stator support part is connected to said rear wall with at least one of a positive fitting and a non-positive fitting.

3. The washing tub according to claim 1, wherein:

said rear wall has a base wall and a reinforcing ring; and said stator support part is connected to said base wall and to said reinforcing ring.

4. The washing tub according to claim 3, wherein said reinforcing ring has a collar enclosing said stator support part.

5. The washing tub according to claim 1, wherein:

said drive mechanism has a bearing sleeve; and said stator support part encloses said bearing sleeve.

6. The washing tub according to claim 1, wherein said stator support part forms a bearing sleeve for receiving bearings through which said shaft is mounted to said rear wall.

7. The washing tub according to claim 1, wherein:

said drive mechanism has a bearing sleeve; and said bearing sleeve has a plastic shell.

8. The washing tub according to claim 7, wherein said plastic shell is a reinforcing ring.

9. The washing tub according to claim 1, wherein said stator support part has rings concentric with said shaft.

10. The washing tub according to claim 1, wherein said rear wall has a base wall with a convexity concentric with said shaft and enclosed by said stator support part.

11. In a washing machine, a washing tub comprising:

a plastic injection-molded rear wall;

a shaft mounted in said rear wall;

an at least substantially horizontally mounted laundry drum connected to said shaft in a rotationally fixed manner;

a drive mechanism connected to said drum for driving said drum, said drive mechanism having a stator support part; and said rear wall being plastic injected molded around said stator support part for rotationally fixing said stator support part thereto.

12. The washing tub according to claim 11, wherein said stator support part is connected to said rear wall with at least one of a positive fitting and a non-positive fitting.

13. The washing tub according to claim 11, wherein said rear wall has a base wall and a reinforcing ring; and said stator support part is connected to said base wall and to said reinforcing ring.

14. The washing tub according to claim 13, wherein said reinforcing ring has a collar enclosing said stator support part.

15. The washing tub according to claim 11, wherein:

said drive mechanism has a bearing sleeve; and said stator support part encloses said bearing sleeve.

16. The washing tub according to claim 11, wherein said stator support part forms a bearing sleeve for receiving bearings through which said shaft is mounted to said rear wall.

17. The washing tub according to claim 11, wherein:

said drive mechanism has a bearing sleeve; and said bearing sleeve has a plastic shell.

18. The washing tub according to claim 17, wherein said plastic shell is a reinforcing ring.

19. The washing tub according to claim 11, wherein said stator support part has rings concentric with said shaft.

20. The washing tub according to claim 11, wherein said rear wall has a base wall with a convexity concentric with said shaft and enclosed by said stator support part.

\* \* \* \* \*